United States Patent
Henschel et al.

(10) Patent No.: US 6,829,815 B1
(45) Date of Patent: Dec. 14, 2004

(54) METHOD FOR PRODUCING A ROTOR OR STATOR OF AN ELECTRICAL MACHINE FROM SHEET-METAL BLANKS

(75) Inventors: Matthias Henschel, Rheinmuenster (DE); Martin Heyder, Buehl-Eisental (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,151

(22) PCT Filed: Jul. 1, 1999

(86) PCT No.: PCT/DE99/01922

§ 371 (c)(1),
(2), (4) Date: Aug. 7, 2001

(87) PCT Pub. No.: WO00/28644

PCT Pub. Date: May 18, 2000

(30) Foreign Application Priority Data

Nov. 6, 1998 (DE) .......................... 198 51 217

(51) Int. Cl.$^7$ .................... H02K 15/10; H02K 15/02
(52) U.S. Cl. .................... 29/598; 29/592.1; 29/596; 29/602.1; 29/609; 83/29; 83/35; 83/36; 83/50; 310/216; 310/217; 310/218; 310/259
(58) Field of Search ................. 29/592.1, 596, 29/598, 602.1, 607; 83/29, 35, 36, 50, 220, 259; 310/216, 217, 218, 259

(56) References Cited

U.S. PATENT DOCUMENTS

| | | | | |
|---|---|---|---|---|
| 4,356,377 A | * | 10/1982 | Norton et al. | 219/121.18 |
| 4,578,853 A | * | 4/1986 | Wurth | 29/598 |
| 4,993,290 A | * | 2/1991 | Obradovic | 83/32 |
| 5,037,706 A | * | 8/1991 | Lin et al. | 428/593 |
| 5,095,610 A | * | 3/1992 | Schultz et al. | 29/596 |
| 5,261,152 A | * | 11/1993 | Simozaki et al. | 29/609 |
| 5,265,320 A | * | 11/1993 | Greenway | 29/596 |
| 5,309,627 A | * | 5/1994 | Burrage et al. | 29/738 |
| 5,744,893 A | * | 4/1998 | Zhao et al. | 310/259 |
| 5,826,323 A | * | 10/1998 | Walters | 29/593 |
| 5,923,112 A | * | 7/1999 | Bertocchi et al. | 310/217 |
| 5,997,232 A | * | 12/1999 | Sauer | 413/1 |
| 6,131,268 A | * | 10/2000 | Neuenschwander | 29/596 |
| 6,145,424 A | * | 11/2000 | Matsuda et al. | 83/227 |
| 6,223,417 B1 | * | 5/2001 | Saban et al. | 29/598 |
| 6,242,840 B1 | * | 6/2001 | Denk et al. | 310/254 |
| 6,374,480 B1 | * | 4/2002 | Rand | 29/605 |
| 6,487,770 B1 | | 12/2002 | Bernauer et al. | 29/598 |

FOREIGN PATENT DOCUMENTS

| | | | | |
|---|---|---|---|---|
| DE | 3246356 A | * | 6/1984 | H02K/1/26 |
| EP | 111193 A1 | * | 6/1984 | H02K/1/26 |
| JP | 56091654 A | | 7/1981 | |
| JP | 09141351 A | * | 6/1997 | B21D/39/03 |

* cited by examiner

Primary Examiner—A. Dexter Tugbang
Assistant Examiner—Paul Kim
(74) Attorney, Agent, or Firm—Ronald E. Greigg

(57) ABSTRACT

Sheet-metal blanks for rotors or stators of electrical machines are cut from rolled sheet-metal strips with a magnetic preferential direction and layered to form a laminated rotor core or laminated stator core. To compensate largely for a magnetic anisotropy of the laminated rotor core or laminated stator core, the sheet-metal blanks, when they are not centrosymmetrical, are cut out together congruently in a single cutting operation, from rolled sheet-metal strips stacked one above the other and rotated relative to one another by an angle.

5 Claims, 1 Drawing Sheet

METHOD FOR PRODUCING A ROTOR OR STATOR OF AN ELECTRICAL MACHINE FROM SHEET-METAL BLANKS

CROSS-REFERENCE TO RELATED APPLICATIONS

This application is a 35 USC 371 application of PCT/DE 99/01922 filed on Jul. 1, 1999.

FIELD OF THE INVENTION

The invention is directed to electric machine, and more particularly to a method of producing an electric machine rotor or stator from sheet metal blanks.

DESCRIPTION OF THE PRIOR ART

One method for producing a rotor of an electrical machine from sheet metal blanks in which the sheet-metal blanks, stamped out with a die, are embodied centrosymmetrically is known from German Patent Disclosure DE 32 46 356 A1. The sheet-metal blanks are arranged in the laminated rotor core, if the geometric embodiment of the blanks allows it, arranged in random distribution or at a certain angle relative to the next sheet-metal blank in the circumferential direction. The intent is largely to compensate for the magnetic anisotropy generated by the process of rolling the metal sheets. With asymmetrical sheet-metal blanks, however, this method fails, since the nonrotatability means that the magnetic preferential direction of all the sheet-metal blanks is oriented in the same direction.

ADVANTAGES SUMMARY OF THE INVENTION

The method of the invention with the has the advantage over the prior art that in a single work step, two congruent sheet-metal blanks are created, which depending on the angle of sheet-metal strip rotation have magnetic preferential directions extending differently, so that as a result, when the sheet-metal blanks are stacked in pairs to form a laminated rotor core or laminated stator core, extensive cancellation of the magnetic anisotropy can be achieved. By the multi-ply cutting of the sheet-metal blanks in one cutting operation, that is, using a die, tool costs are also saved, since otherwise two cutting tools would be required. The production costs for a laminated core are also reduced, since per cutting operation, a plurality of sheet-metal blanks can be created simultaneously.

BRIEF DESCRIPTION OF THE DRAWINGS

One example of a method according to the invention is described in further detail below in conjunction with the drawing, in which.

DESCRIPTION OF THE PREFERRED EMBODIMENTS

Figure 1:
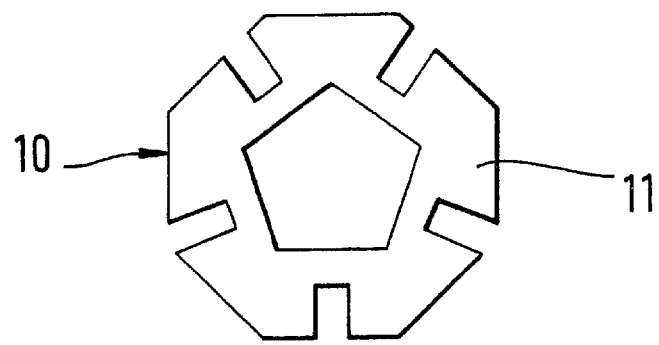
FIG. 1 in a plan view shows a laminated stator core, layered from congruent sheet-metal blanks;, and FIG. 2 schematically shows a cutting tool, supplied with two rolled sheet-metal strips, in plan view.

A laminated stator core 10 shown in FIG. 1 comprises one-piece sheet-metal blanks 11, layered congruently on one another, which are not embodied centrosymmetrically; that is, the sheet-metal blanks are not meant to be disposed congruently by rotation about an angle of less than 360°. Such sheet-metal blanks are cut from rolled sheet-metal strips, which because of rolling operations occurring in the course of their production have a magnetic preferential direction. A laminated core formed of sheet-metal blanks with the same magnetic preferential direction would therefore have a magnetic preferential direction extending in the same direction in all the sheet-metal blanks. The result would be a disadvantageous behavior in terms of power and noise of the machine (motor or generator) that has the laminated core.

Figure 2:
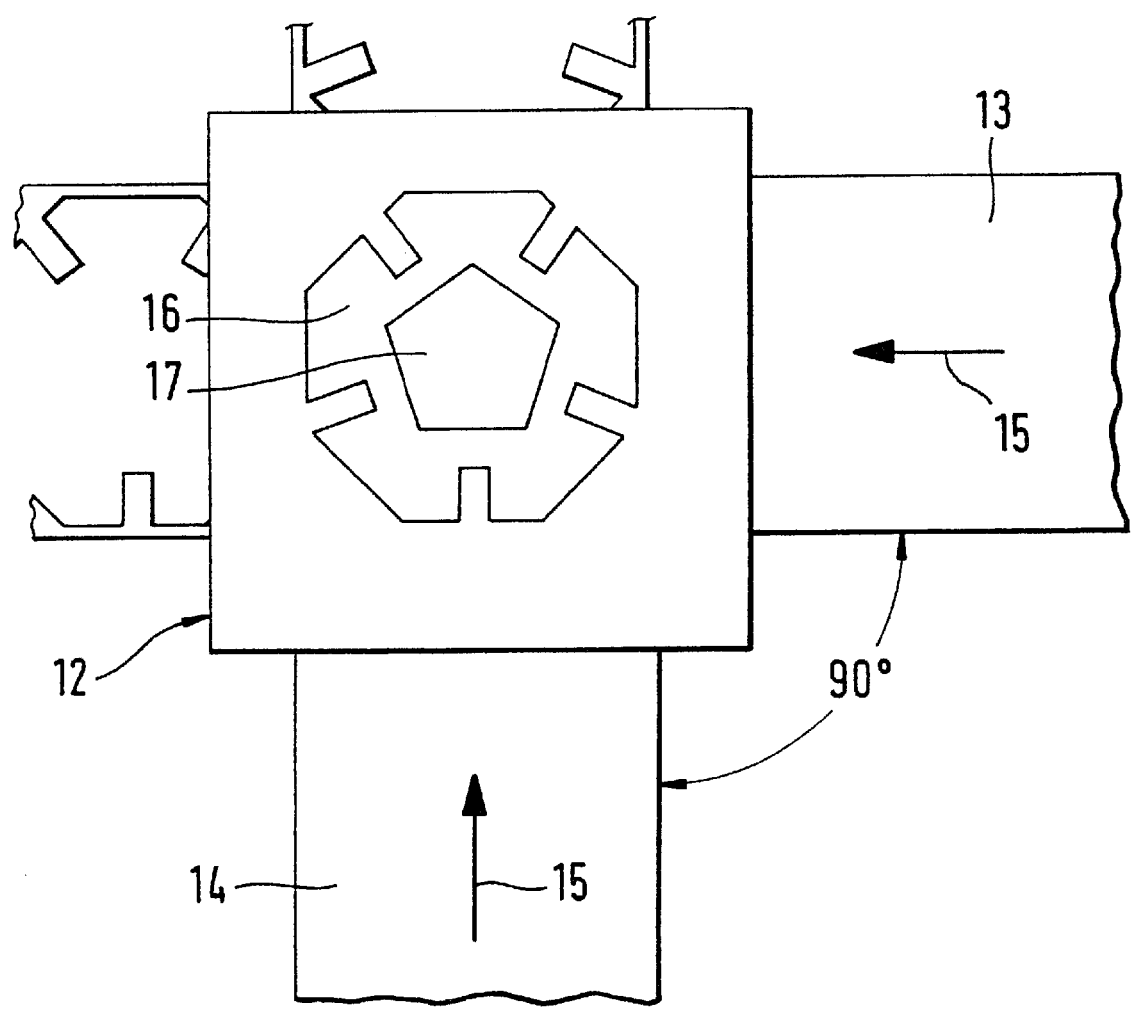

According to the invention, the sheet-metal blanks 11 of the laminated stator core 10 are produced with a cutting tool 12, shown schematically in FIG. 2, from two rolled sheet-metal strips 13 and 14, which are delivered to the tool rotated by an angle of 90° from one another. The two rolled sheet-metal strips 13 and 14 have the same magnetic preferential direction, indicated by an arrow 15 extending in their longitudinal direction. The arrows 15 at the same indicate the direction of advancement of the rolled sheet-metal strips 13 and 14. The two rolled sheet-metal strips 13 and 14 are passed, resting on one another, through the cutting tool 12. A die 16 of the cutting tool 12, in a single cutting operation, cuts two congruent sheet-metal blanks 11 one from each of the two rolled sheet-metal strips 13 and 14. Such pairs of sheet-metal blanks 11, layered on one another, form the laminated stator core 10. The sheet-metal blanks have magnetic preferential directions that in alternation are rotated by 90° from one another. A magnetic anisotropy of the laminated stator core 10 is thus largely compensated for.

In practice, a progressive die will be used as the cutting tool 12; each with a separate die, in a first operation, the follow cut cuts a core blank 17 from the two rolled sheet-metal strips 13 and 14. In a second work step, with the die 16 of the cutting tool 12, the sheet-metal blanks 11 are then cut simultaneously in pairs, as described above, from the rolled sheet-metal strips 13 and 14. It is also possible in a separate cutting tool first to cut the core blank 17 from the two rolled sheet-metal strips 13 and 14 separately from one another, and then to deliver rolled sheet-metal strips 13 and 14, thus prepared, to the cutting tool 12 and with the cutting tool to make the sheet-metal blanks 11 in pairs.

In a departure from the above method example, it is also possible, if the structural design of the stator of the electrical machine allows it, for the sheet-metal blanks 11 to be cut from sheet-metal strips that are delivered to the cutting tool 12 at an angle other than 90°. The method of the invention can also be employed in the production of electrical machine rotors layered from one-piece, congruent sheet-metal blanks. A further development of the method of the invention can also comprise making sheet-metal blanks from more than two rolled sheet-metal strips jointly by multi-layer cutting.

The foregoing relates to preferred exemplary embodiments of the invention, it being understood that other variants and embodiments thereof are possible within the spirit and scope of the invention, the latter being defined by the appended claims.

We claim:

1. In a method for producing a rotor or stator of an electrical machine from one-piece, congruent sheet-metal blanks (11), which are layered or rolled sheet-metal strips (13, 14) with a magnetic preferential direction (15) to form a laminated rotor core or laminated stator core (10), the improvement comprising cutting out the sheet-metal blanks (11) together congruently in one cutting operation from rolled sheet-metal strips (13, 14) stacked one above the other and rotated by an angle relative to one another, wherein the rolled sheet-metal strips (13, 14) are rotated by an angle of 90° relative to one another.

2. In a method for producing a rotor or stator of an electrical machine from one-piece, congruent sheet-metal blanks (11), which are cut from sheet-metal strips (13, 14) with a magnetic preferential direction (15) to form a laminated rotor core or laminated stator core (10), the improvement comprising cutting out two or more of the sheet-metal blanks (11) together congruently in one cutting operation from sheet-metal strips (13, 14) which are stacked one above the other with the magnetic preferential direction of each strip being rotated by an angle relative to the magnetic preferential direction of the adjacent strip so that upon assembly, the laminated rotor core or the laminated stator core has a resulting rotated magnetic preferential direction for each blank, when compared to any adjacent blanks, which compensates for magnetic anisotropy in the individual sheet-metal blanks.

3. The method of claim 2, wherein at least two sheet-metal strips (13, 14) are passed simultaneously through a cutting tool (12).

4. The method of claim 2, wherein the sheet-metal strips (13, 14) have their magnetic preferential direction rotated by an angle of 90° relative to one another while they are being cut.

5. The method of claim 2, wherein the sheet-metal strips (13, 14) are rolled sheet-metal and the rolling direction of the strips is rotated by ah angle of 90° relative to one another while they are being cut.

* * * * *